United States Patent Office 3,605,954
Patented Sept. 20, 1971

3,605,954
EMERGENCY STOPPING DEVICE FOR AUTOMOBILES
Manzo Wakabayashi, 7-13 2-chome, Nishirokugo, Ota-ku, Tokyo, Japan, and Teikichi Kobayashi, Shibata, Japan; said Kobayashi assignor to said Wakabayashi
Filed Feb. 24, 1969, Ser. No. 801,270
Claims priority, application Japan, Sept. 30, 1968, 43/70,184; Oct. 19, 1968, 43/75,847
Int. Cl. B60t 1/00
U.S. Cl. 188—4       5 Claims

ABSTRACT OF THE DISCLOSURE

The present invention relates to a device for stopping an automobile in case of an emergency, said device being characterized by the fact that it comprises a channel-shaped base plate supporting one end of a frame. Rollers are pivotally attached to the frame, said rollers, together with another roller at one end of the channel-shaped base plate, serving as idler rollers for the automobile wheels. Anti-skid projections are provided on the bottom of the channel-shaped base plate, and a strut which holds the frame upright to prevent the forward movement of the wheel is held in place by suitable spring means.

---

Figure 1:
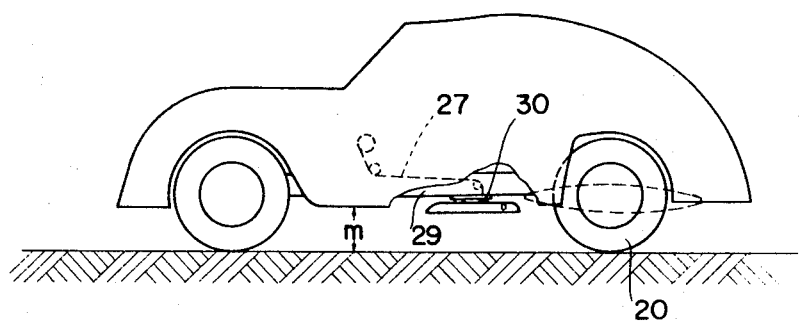
Figure 2:
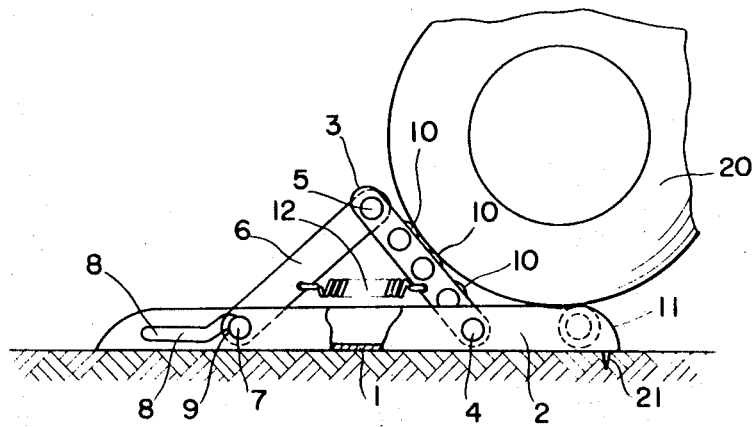
Figure 3:
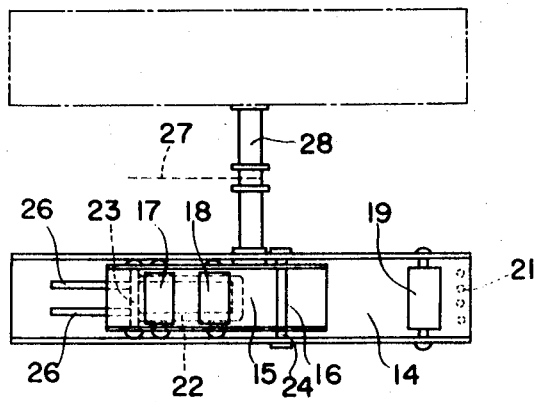
Figure 4:
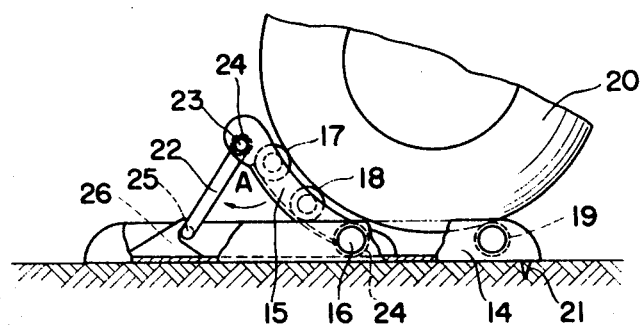
Figure 5:
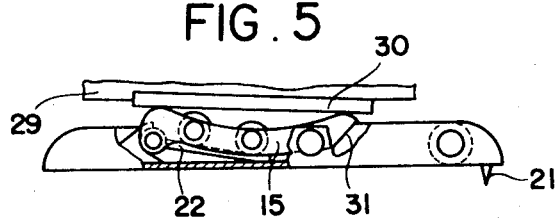
Figure 6:
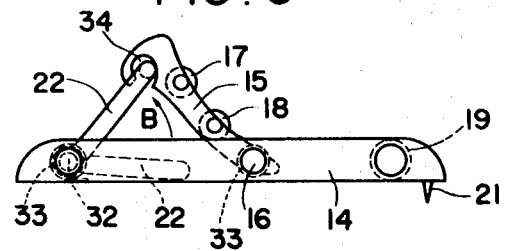

The present invention relates to an emergency stopping device for automobiles. The primary object of this invention is to provide an emergency stopping device which hangs below the chassis of an automobile and, in case of an emergency, is dropped directly in the path of each rear wheel by manipulation from the driver's seat, thereby causing the rear wheel to ride idly on said device and bringing the car to a sudden stop. This invention accordingly provides an emergency stopping device for automobiles which, unlike conventional means, can stop the automobile quite effectively without causing any skidding by the automobile, and without any strong shock to the driver. Other objects of this invention will become apparent from the following description of several representative embodiments with reference to the accompanying drawings, in which:

FIG. 1 shows an automobile equipped with an emergency stopping device according to this invention;
FIG. 2 shows the emergency stopping device of FIG. 1 in stopping position;
FIG. 3 is a plan view showing another embodiment of this invention in the folded up position;
FIG. 4 is a side view of the embodiment of FIG. 3 shown in stopping position;
FIG. 5 is a side view showing the device of FIG. 3 folded up under the chassis; and
FIG. 6 is a side view showing still another embodiment of the invention.

Referring now to the embodiment of FIG. 2, a frame 3 is supported by an axle 4 journaled in flanges 2 which extend upwardly from opposite sides of a channel-shaped base plate 1. A strut 6 is pivotally attached to the frame 3 by an axle 5. A shaft 7 located at the other end of the strut 6 projects into a guide slot 8 having a curved portion 9. The frame 3 carries a series of rollers 10, 10, 10 pivoted between its sides. The series of rollers 10, together with another roller 11 journaled at the end of said channel-shaped plate 1, serve as idler rollers for the wheel. The bottom of the base plate 1 is equipped with anti-skid projections 21 and a coil spring 12 is stretched between the frame 3 and strut 6.

When folded up, this emergency stop device takes very little room in a vertical direction, and in the case of a passenger car having a small road clearance (m in FIG. 1), it proves highly effective. The rollers are preferably covered with rubber or synthetic resin.

The second embodiment illustrated in FIGS. 3-5 is a further improvement which is smaller in height and length, and yet reliable in action. Turning now to FIG. 4, one end of a channel-shaped frame 15 is supported near one end of a base plate 14 on an axle 16 on which a coil spring 24 is wound. This spring biases the frame 15 toward an erect position away from the base plate 14. Rollers 17, 18 are pivotally mounted in the frame 15 and these rollers, together with a roller 19 provided near the end of the base plate 14, act as idler rollers for the wheel 20. The bottom of the end of the channel-shaped base plate 14 which carries the roller 19 is equipped with anti-skid projections 21. The free end of the frame 15 is pivotally supported by a strut 22 which carries a shaft 23 fixed thereto. A coil spring 24 is connected between the shaft 23 and the frame 15 so that the spring always tends to turn the strut in the direction A and so that it swings out from under the frame 15. The channel-shaped base plate 14 is provided with catch 26 which hooks the free end 25 of the strut 22 when it swings out. As in the preceding embodiment, the rollers 17, 18, 19 are preferably covered with rubber or synthetic resin.

As illustrated in FIG. 3, these emergency stopping devices which are identical in construction are linked by a connecting shaft 28 at the same distance from the rear wheels. As shown in FIG. 5, they may be folded up with the strut 22 tucked under the frame 15, and as shown in FIG. 1 they are hung beneath the car body by means of a cable or chain 27. They are retained in the folded up position by pressing the frame 15 against the downwardly projecting boards 30 on both sides of the chassis 29. In this embodiment, if the axle 16 is attached to a spring which tends to raise the frame 15, the action will become more reliable. The frame 15 may be pressed against any part of the car body other than the boards 30.

In the third embodiment shown in FIG. 6, one end of the frame 15 is pivoted near one end of the channel-shaped base plate 14. Rollers 17, 18 are pivotally mounted in the frame and these rollers, together with the roller 19 provided at the end of the channel-shaped base plate 14, serve as idler rollers for the wheel 20. The bottom of the channel-shaped base plate 14 is equipped with anti-skid projections 21, and in the mechanism including the strut which causes the frame 15 to rise to prevent progress by the wheel, the strut 22 is pivoted at the end of the base plate 14 opposite the one carrying the roller 19. A spring 33 which tends to turn in the direction B and raise the strut 22 is provided; and a second spring 33 at the base of the frame 15 tends to raise the frame 15. The free end of the frame 15 is equipped with a hook 34 which engages the free end of the strut 22.

In order to drop this emergency stopping device from the car body, the cable or chain 27 is released, or a button or a pedal is pushed in the cab, which electrically releases the device. The device is normally hung beneath the car body as shown in FIG. 1; and in this position it is forcibly folded up, because it is pressed, for instance, against the boards 30 on the chassis 29, against the resistance supplied by the springs tending to erect the frame 15. In case of emergency, when the driver unwinds, say, a cable or chain 27, the device drops just in front of the rear wheel and as it is released from the boards 30, the spring force, as shown in FIG. 2, FIG. 4 or FIG. 6, causes the strut 6 or 22 to rise. In the embodiment of FIG. 2 the strut engages the curved part 9 of the slot and is thereby secured in position. In FIG. 4 it is hooked by the catch 26 and thereby secured in position; and in FIG. 6 it is hooked by the catch 34 on the frame 15 and thus secured in position. Then the rear wheel 20 rides on the stopping device. The projections 21 on the bottom of the channel-shaped base plate will then bite into the road surface under the weight of the car and the car will accordingly come to a halt after a short skid. The rear wheel 20 will then idle on the rollers in the upright frame and the roller at the end of the channel-shaped base plate, and as the result the car can be stopped short. The tests carried out by the inventors have shown that, regardless of the weather, fine or wet, the car can be halted from a speed of 50 km./h. within two meters of the moment at which this device is applied.

This device can be built very simply and is small in height and length when folded. The frame is able to spring into upright position very quickly. Therefore, even if it is installed beneath a car with a small road clearance, the device can become ready for action before it strikes the ground. Since the bottom surface of the channel-shaped base plate is equipped with projections, the car can be instantly halted in an emergency after a negligibly short skid; and the wheel, which is still turning, will then idle on the rollers of the frame and base plate. Thus, in spite of its compactness, the device is powerful enough to stop the car quite suddenly in an emergency. Particularly, it exhibits a remarkable effect when attached to a passenger car having a small road clearance.

What is claimed is:

1. An emergency stopping device for an automobile which comprises a channel-shaped base plate having projections which extend downwardly from its bottom, a frame, one end of which is pivotally attached to one end of said base plate, transverse rollers pivotally mounted in said frame, a strut swingably connected to said base plate for movement between a compressed position approximately parallel to said base plate and an angular position at which it supports said frame at an angle with respect to said base plate, means for latching said frame a nd strut in said angular position, spring means biasing said strut toward said angular position, and releasable means for holding said base plate and strut in said compressed position against the bottom of said automobile.

2. An emergency stopping device for an automobile as claimed in claim 1, in which said channel-shaped base member has slotted sidewalls, said means for holding said frame and said strut in said angular position comprises curved portions in the edges of said slots in the base and an axle on which one end of the strut swings, with the ends of said axle being slidably journaled in said slots.

3. An emergency stopping device for an automobile as claimed in claim 1, in which said means for holding said frame and said strut in said angular position comprises in combination a hook member on the base plate positioned to engage one end of the strut, the other end of said strut is pivotally attached to the frame.

4. An emergency stopping device for an automobile as claimed in claim 1, wherein said means for holding said frame and said strut in said angular position comprises in combination a hook at one end of the frame positioned to engage one end of the strut, the other end of said strut being pivoted to the base plate.

5. An emergency stopping device for an automobile as claimed in claim 1, in which said rollers are covered with a rubber-like material.

References Cited

UNITED STATES PATENTS

| | | | |
|---|---|---|---|
| 2,085,385 | 6/1937 | Perillo | 188—4(A) |
| 2,732,035 | 1/1956 | Besoyan | 188—32X |
| 2,895,569 | 7/1959 | Nystrom | 188—32 |
| 3,131,820 | 5/1964 | Creedon | 188—32UX |

FOREIGN PATENTS

| | | | |
|---|---|---|---|
| 621,188 | 1/1927 | France | 188—32 |
| 1,121,937 | 1/1962 | Germany | 188—32 |
| 372,816 | 2/1939 | Italy | 188—32 |

GEORGE E. A. HALVOSA, Primary Examiner

U.S. Cl. X.R.

188—32